US010673052B2

(12) United States Patent
Kim

(10) Patent No.: US 10,673,052 B2
(45) Date of Patent: Jun. 2, 2020

(54) RECHARGEABLE BATTERY MODULE AND RECHARGEABLE BATTERY PACK

(71) Applicant: SAMSUNG SDI CO., LTD., Yongin-si, Gyeonggi-do (KR)

(72) Inventor: Dukjung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 170 days.

(21) Appl. No.: 15/702,990

(22) Filed: Sep. 13, 2017

(65) Prior Publication Data

US 2018/0130991 A1 May 10, 2018

(30) Foreign Application Priority Data

Nov. 8, 2016 (KR) .................. 10-2016-0148230

(51) Int. Cl.
*H01M 2/20* (2006.01)
*H01M 2/10* (2006.01)
*H01M 10/42* (2006.01)

(52) U.S. Cl.
CPC ......... *H01M 2/206* (2013.01); *H01M 2/1077* (2013.01); *H01M 2/1083* (2013.01); *H01M 10/425* (2013.01); *H01M 2220/20* (2013.01)

(58) Field of Classification Search
None
See application file for complete search history.

(56) References Cited

U.S. PATENT DOCUMENTS

| 2013/0052515 | A1  | 2/2013  | Park et al. |
| 2013/0319777 | A1  | 12/2013 | Choo et al. |
| 2015/0295214 | A1* | 10/2015 | Cho ............... H01M 2/1077 429/121 |
| 2016/0372736 | A1  | 12/2016 | Kim et al. |

FOREIGN PATENT DOCUMENTS

| JP | 2006-140022 A    | 6/2006  |
| KR | 10-2011-0087938 A | 8/2011  |
| KR | 10-2013-0022593 A | 3/2013  |
| KR | 10-2015-0140120 A | 12/2015 |

* cited by examiner

*Primary Examiner* — Daniel S Gatewood
(74) *Attorney, Agent, or Firm* — Lee IP Law, P.C.

(57) ABSTRACT

A rechargeable battery module includes a plurality of unit cells adjacent to each other in a first direction, each unit cell including an electrode assembly in a case, a cap plate sealing an opening of the case, and an electrode terminal electrically connected to the electrode assembly through the cap plate, a bus bar electrically connecting electrode terminals of unit cells adjacent in the first direction, a module frame accommodating the plurality of unit cells, the module frame including at least two sidewalls spaced apart from each other in the first direction to restrict opposite sides of the first direction, and a bottom supporting the at least two side walls, a restricting member fixed to a top of the module frame, the restricting member being spaced apart from the bottom of the module frame along a second direction perpendicular to the first direction to restrict the second direction.

20 Claims, 9 Drawing Sheets

RECHARGEABLE BATTERY MODULE AND RECHARGEABLE BATTERY PACK

CROSS-REFERENCE TO RELATED APPLICATION

Korean Patent Application No. 10-2016-0148230, filed on Nov. 8, 2016, in the Korean Intellectual Property Office on, and entitled: "Rechargeable Battery Module and Rechargeable Battery Pack," is incorporated by reference herein in its entirety.

BACKGROUND

1. Field

The present disclosure relates to a rechargeable battery module and to a rechargeable battery pack. More particularly, the present disclosure relates to a rechargeable battery module and to a rechargeable battery pack that are formed by connecting electrode terminals of unit cells accommodated in a module frame with a bus bar.

2. Description of the Related Art

A rechargeable battery differs from a primary battery in that it can be repeatedly charged and discharged, while the latter is incapable of being recharged. A low-capacity rechargeable battery is used in small portable electronic devices, e.g., mobile phones, notebook computers, and camcorders, while a high-capacity rechargeable battery can be used as a power source for driving motors of, e.g., a hybrid vehicle, an electric vehicle, and the like.

The rechargeable battery may be used in small electronic devices as a single cell battery or in motor-driving power sources, etc. as a battery module in which a plurality of battery cells are electrically connected or as a battery pack in which a plurality of battery modules are electrically connected. That is, the rechargeable battery module may include a plurality of unit cells, a frame for accommodating the unit cells, and a bus bar for electrically connecting electrode terminals of the unit cells.

SUMMARY

An exemplary embodiment provides a rechargeable battery module including a plurality of unit cells in which an electrode assembly performing charging and discharging operations is accommodated in a case, an opening of the case is closed and sealed by a cap plate, an electrode terminal electrically connected to the electrode assembly to be installed at the cap plate is provided, and of which wide surfaces face each other in a first direction, a bus bar configured to electrically connect electrode terminals of unit cells adjacent in the first direction, a module frame configured to accommodate the unit cells to restrict opposite sides of the first direction and one side of a second direction crossing the first direction, and a restricting member configured to be fixed to the module frame at the other side of the second direction to restrict the other side of the second direction of the unit cells.

In a third direction crossing the second direction, the restricting member may include a fastener rib protruding toward the unit cell to press one side of the unit cell.

An insulating sheet may be disposed between the unit cells and between the module frame and the unit cell in the first direction.

The restricting member may include a recess portion recessed in the third direction farther than the fastener rib in the second direction to open one side of the insulating sheet.

The restricting member may be fixed to the module frame with a first fastening member, and may press the cap plate of the unit cell with the fastener rib.

The restricting member may be fixed to the module frame with first fastening member, and may press the electrode terminal of the unit cell with the fastener rib.

The rechargeable battery module may further include a first insulating member configured to be integrally provided between the fastener rib and the electrode terminal and on an upper surface of the fastener rib, a printed circuit board configured to be provided on the first insulating member, and a second fastening member configured to pass through the printed circuit board, the fastener rib, and the first insulating member to be fastened to the electrode terminal.

The restricting member may be fixed to the module frame with first fastening member, and may press the electrode terminal of the unit cell with the fastener rib with a second insulating member therebetween.

The rechargeable battery module may further include a second fastening member configured to pass through the fastener rib and the second insulating member to be fastened to the electrode terminal, a printed circuit board configured to be provided on the fastener rib with a third insulating member therebetween; and a third fastening member configured to pass through the printed circuit board and the third insulating member to be fastened to the fastener rib.

Another embodiment provides a rechargeable battery pack including a plurality of rechargeable battery modules in which a plurality of unit cells are accommodated in a module frame, electrode terminals of the unit cells are connected by a bus bar, and the unit cells are restricted by the module frame by a restricting member, a pack frame configured to accommodate the rechargeable battery modules disposed to be adjacent to each other in a first direction and a third direction crossing in a planar surface; and a bracket configured to connect the rechargeable battery module and the pack frame to each other in at least one of the first direction and the third direction to be fixed to the pack frame in the second direction crossing the planar surface.

The bracket may connect one point of the module frame and three points of the pack frame at a corner of the pack frame to be fixed to a bottom and a lateral wall of the pack frame.

The bracket may connect one point of each of two module frames and two points of the pack frame at a side of the pack frame to the bottom and the lateral wall of the pack frame.

The bracket may be spaced apart from the pack frame, and may connect respective one point of four module frames to be fixed to the bottom of the pack frame.

The rechargeable battery modules may be connected by the module bus bar.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
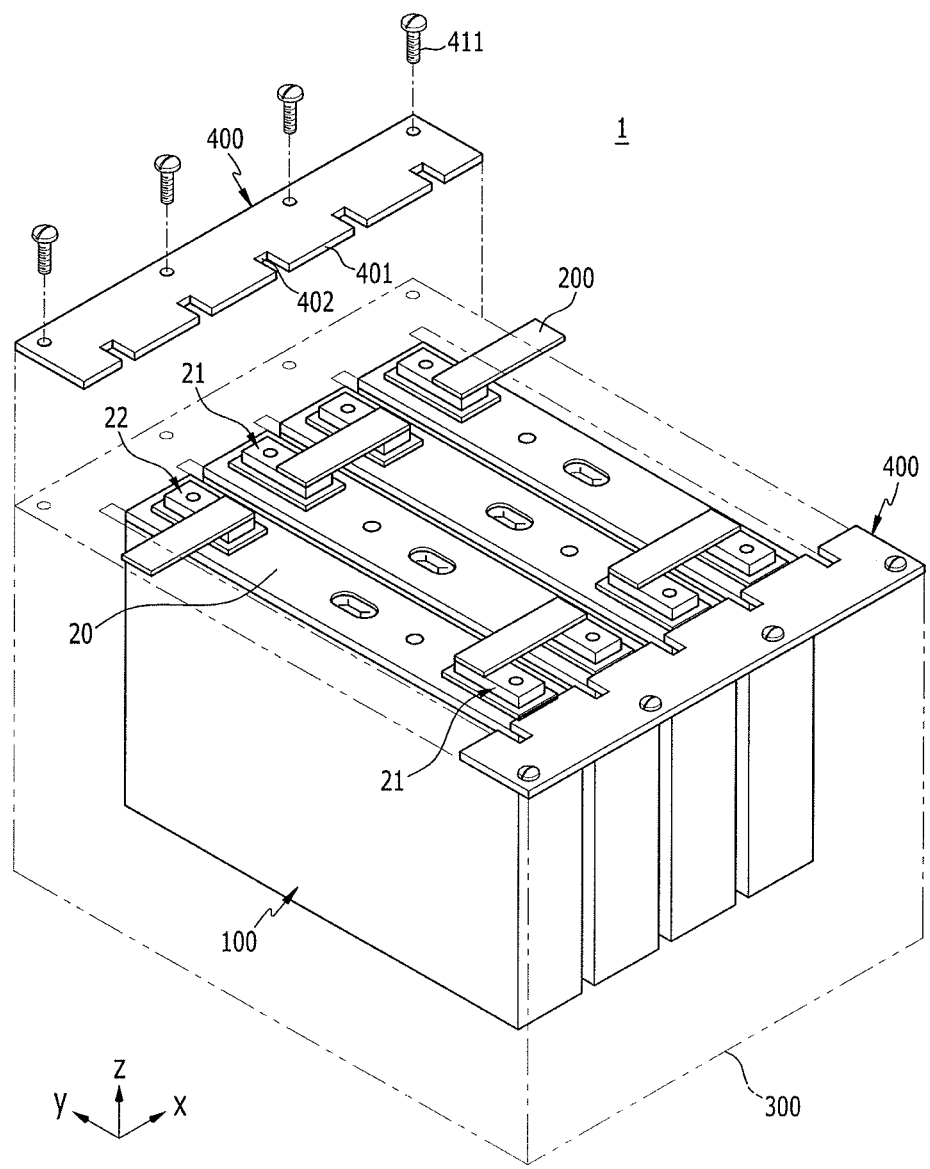
FIG. 1 illustrates a perspective view of a rechargeable battery module according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
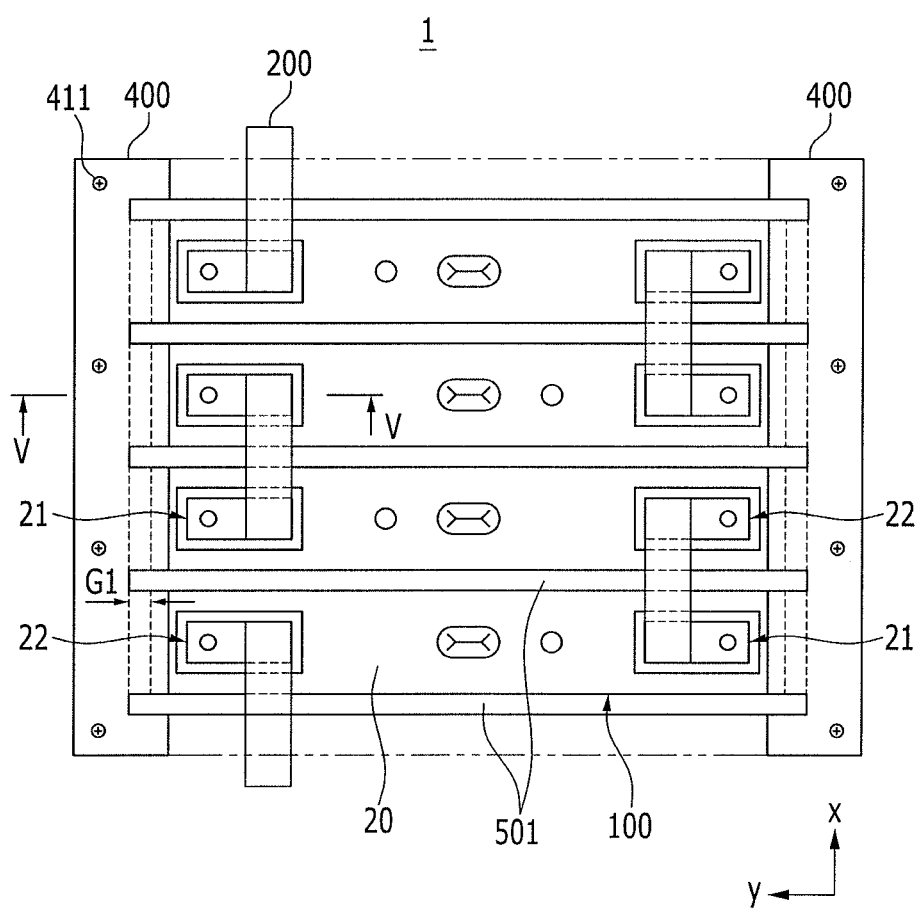
FIG. 2 illustrates a top plan view of the rechargeable battery module of FIG. 1.

FIG. 1 illustrates a perspective view of a rechargeable battery module according to a first exemplary embodiment, and FIG. 2 illustrates a top plan view of the rechargeable battery module of FIG. 1. Referring to FIG. 1 and FIG. 2, a rechargeable battery module 1 of a first exemplary embodiment may include a plurality of unit cells 100, a bus bar 200 for electrically connecting the unit cells 100, a module frame 300 for accommodating the unit cells 100, and a restricting member 400 for restricting movement of the unit cells 100.

The unit cells 100, which are formed with the rechargeable battery, may be disposed to be adjacent to each other in a first direction (x-axis direction), and in this case, wide surfaces thereof face each other. The unit cells 100 are electrically and mechanically connected to each other to form the rechargeable battery module 1. The bus bar 200 may be disposed on the rechargeable battery module 1 to electrically connect the unit cells 100 adjacent in the x-axis direction, e.g., one bus bar 200 may connect two unit cells 100 adjacent to each other in the x-axis direction.

The module frame 300 accommodates the unit cells 100 in the inside thereof, and it restricts opposite sides of the unit cell 100 in the first direction (x-axis direction) and one side of the unit cell in a second direction (z-axis direction) crossing the first direction. That is, the unit cells 100 are respectively restricted before and after the x-axis direction and down the z-axis direction by the module frame 300. In other words, the unit cells 100 are arranged adjacent to each other along the x-axis direction between two opposite sidewalls of the module frame 300 that are spaced apart from each other in the x-axis direction, and the unit cells 100 are arranged on a bottom of the module frame 300 along the z-axis direction. That is, the unit cells 100 are respectively restricted before and after the x-axis direction, i.e., between the opposite sidewalls of the module frame 300, and down the z-axis direction by the module frame 300, i.e., and by the bottom of the module frame 300. The unit cells 100 may be spaced apart by a first gap G1 (refer to FIG. 2 and FIG. 5) from an inner wall of the module frame 300 in a third direction (y-axis direction) crossing the first and second directions (x-axis and z-axis directions).

The restricting member 400 is fixed to the module frame 300 at the other side of the second direction (z-axis direction) to restrict the other side of the second direction of the unit cells 100. In other words, the restricting member 400 is fixed to the module frame 300 at a side opposite to the bottom of the module frame 300. That is, the restricting member 400 is fixed to an upper end of the module frame 300 to restrict upper portions of the unit cells 100.

Accordingly, the unit cells 100 are restricted before and after the x-axis direction by the module frame 300, and they are restricted up and down the z-axis direction by a bottom of the module frame 300 and the restricting member 400. That is, opposite sidewalls of the module frame 300 that are spaced apart from each other in the x-axis direction restrict the unit cells 100 in the x-axis direction, and the bottom of the module frame 300 with the restricting member 400 restrict the unit cells 100 in the z-axis direction.

An insulating sheet 501 may be disposed in the first direction (x-axis direction) between the unit cells 100 and between an inner wall of the module frame 300 and the unit cell 100, respectively. For example, each insulating sheet 501 may be positioned between two adjacent unit cells 100, and between an inner wall of the module frame 300 and an adjacent unit cell 100. The insulating sheet 501 electrically insulates the adjacent unit cells 100, and absorbs and reduces impact and vibration between the unit cells 100.

Figure 3:
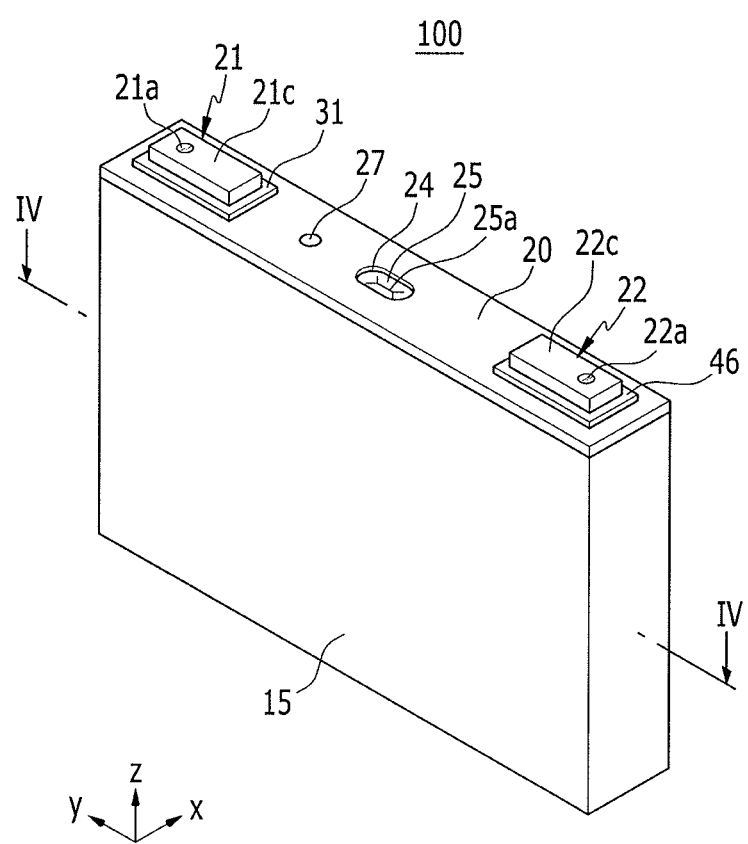
FIG. 3 illustrates a perspective view of a unit cell in FIG. 1.
Figure 4:
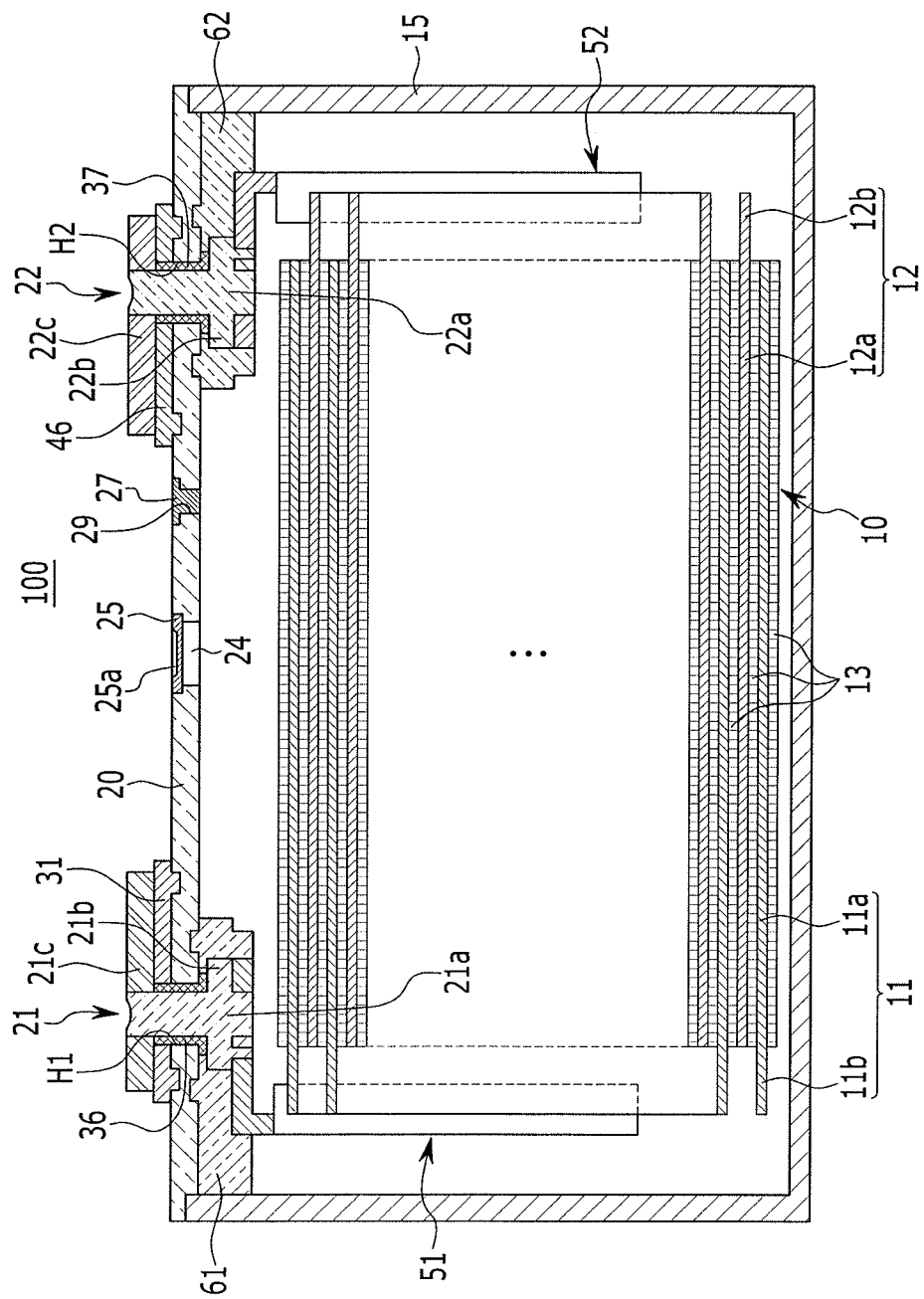
FIG. 4 illustrates a cross-sectional view taken along line IV-IV of FIG. 3.

FIG. 3 illustrates a perspective view of one unit cell 100 in the rechargeable battery module 1, and FIG. 4 illustrates a cross-sectional view taken along line IV-IV of FIG. 3. The unit cell 100 is formed as a rechargeable battery charging or discharging a current.

Referring to FIG. 3 and FIG. 4, the unit cell 100 may include an electrode assembly 10 performing a charging or discharge operation, a case 15 accommodating the electrode assembly 10, a cap plate 20 closing and sealing an opening of the case 15, and electrode terminals 21 and 22 electrically connected to the electrode assembly 10 and installed at the cap plate 20. The electrode assembly 10 may include a negative electrode 11 and a positive electrode 12 at opposite sides of a separator 13, which is an insulator, and the positive electrode 12, the negative electrode 11, and the separator 13 may be spirally wound in a jelly-roll state to form the electrode assembly 10.

In detail, the positive and negative electrodes 11 and 12 may respectively include coated regions 11a and 12a, i.e., where an active material is coated on current collectors made of a metal plate, and uncoated regions 11b and 12b, i.e., where an active material is not coated thereon and which are formed as exposed current collectors. The uncoated region 11b of the negative electrode 11 is formed at one end portion of the wound negative electrode 11. The uncoated region 12b of the positive electrode 12 is formed at one end portion of the wound positive electrode 12. Thus, the uncoated regions 11b and 12b of the negative and positive electrodes 11 and 12 are disposed at opposite ends of the electrode assembly 10, respectively.

For example, the case 15 may be substantially formed as a cuboid in which a space for accommodating the electrode assembly 10 and an electrolyte solution is set, and is formed with the opening for connecting inner and outer spaces at one side of the cuboid. The opening allows the electrode assembly 10 to be inserted into the case 15. For example, the case 15 and the cap plate 20 may be made of aluminum, and they may be welded to each other.

The cap plate 20 may be provided with an electrolyte injection opening 29, a vent hole 24, and terminal holes H1 and H2. After combining the cap plate 20 to the case 15, the electrolyte injection opening 29 allows the electrolyte solution to be injected into the case 15. After being injected with the electrolyte solution, the electrolyte injection opening 29 is sealed with a sealing cap 27.

The vent hole 24 is sealed with a vent plate 25 so as to discharge internal pressure of the unit cell 100. The vent plate 25 is ruptured along a notch 25a to open the vent hole 24 when the internal pressure of the unit cell 100 reaches a predetermined pressure.

The electrode terminals 21 and 22 are provided in the terminal holes H1 and H2 of the cap plate 20, and are electrically connected to the electrode assembly 10 to be drawn out of the case 15. For example, the electrode terminals 21 and 22 may include rivet terminals 21a and 22a, flanges 21b and 22b, and plate terminals 21c and 22c.

The rivet terminals 21a and 22a are provided in the terminal holes H1 and H2 of the cap plate 20, the flanges 21b and 22b are widely formed inside the cap plate 20 while being integrally formed with the rivet terminals 21a and 22a, and the plate terminals 21c and 22c are connected to the rivet terminals 21a and 22a by being riveted or welded while being disposed outside the cap plate 20. Negative and positive gaskets 36 and 37 may be respectively provided between the rivet terminals 21a and 22a of the negative and positive terminals 21 and 22 and the inner sides of the terminal holes H1 and H2 to seal and electrically insulate between the rivet terminals 21a and 22a of the negative and positive terminals 21 and 22 and the cap plate 20.

In the electrode terminal 21 connected to the negative electrode 11, the plate terminal 21c is electrically connected to the rivet terminal 21a, and is disposed at the outside of the cap plate 20 with an insulating member 31 therebetween. The insulating member 31 electrically insulates the plate terminal 21c and the cap plate 20. The negative electrode gasket 36 further extends between the flange 21b and the inner surface of the cap plate 20, thereby further sealing and electrically insulating between the flange 21b and the cap plate 20. That is, the negative electrode gasket 36 is provided with the rivet terminal 21a of the electrode terminal 21 in the terminal hole H1 of the cap plate 20 and a hole of the insulating member 31, thereby preventing leakage of the electrolyte solution through the terminal hole H1 and the hole.

In the electrode terminal 22 connected to the positive electrode 12, the plate terminal 22c is electrically connected to the rivet terminal 22a, and is disposed at the outside of the cap plate 20 with a conductive top plate 46 therebetween. The top plate 46 electrically connects the plate terminal 22c and the cap plate 20. The positive electrode gasket 37 further extends between the flange 22b and the inner surface of the cap plate 20, thereby further sealing and electrically insulating between the flange 22b and the cap plate 20. That is, the positive electrode gasket 37 is provided with the rivet terminal 22a of the electrode terminal 22 in the terminal hole H2 of the cap plate 20 and a hole of the top plate 46, thereby preventing leakage of the electrolyte solution through the terminal hole H2 and the hole.

Negative and positive electrode lead tabs 51 and 52 electrically connect the electrode terminals 21 and 22 to the uncoated regions 11b and 12b of the negative and positive electrodes 11 and 12, respectively. By combining the negative and positive electrode lead tabs 51 and 52 with lower end portions of the rivet terminals 21a and 22a and then caulking the lower end portions, the negative and positive electrode lead tabs 51 and 52 are supported by the flanges 21b and 22b and are connected to the lower end portions of the rivet terminals 21a and 22a.

Negative and positive insulating members 61 and 62 are respectively installed between the negative and positive electrode lead tabs 51 and 52 and the cap plate 20 to electrically insulate therebetween. Further, the negative and positive insulating members 61 and 62 are combined to the cap plate 20 at one side thereof, and enclose the negative and positive electrode lead tabs 51 and 52, the rivet terminals 21a and 22a, and the flanges 21b and 22b at the other side thereof, thereby stabilizing a connecting structure between them.

Figure 5:
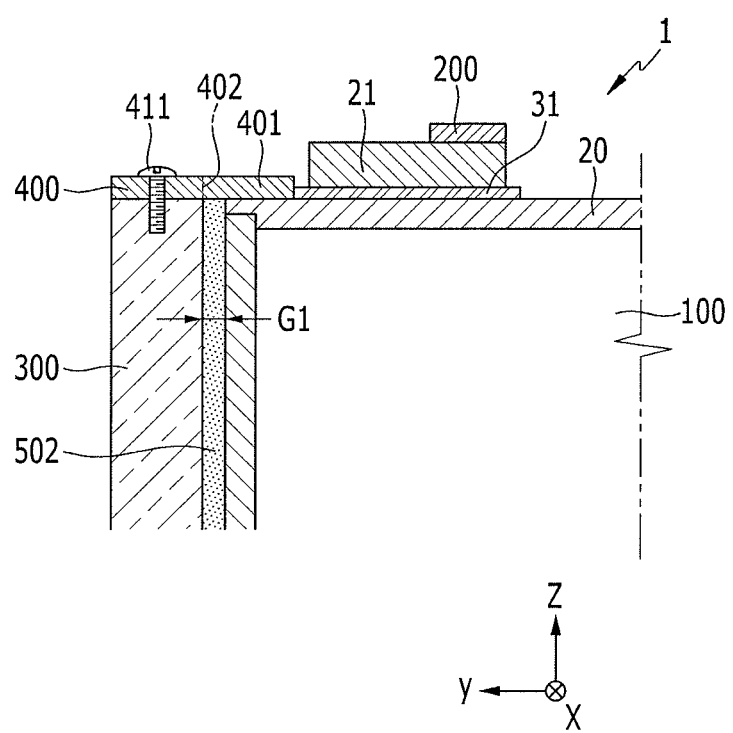
FIG. 5 illustrates a cross-sectional view taken along line V-V of FIG. 2.

FIG. 5 illustrates a cross-sectional view taken along line V-V of FIG. 2. Referring to FIG. 1, FIG. 2, and FIG. 5, the restricting member 400 may include a fastener rib 401 along the first direction (x-axis direction) that protrudes toward the unit cell 100 to press one side of the unit cell 100, and a recess portion 402 in the third direction (y-axis direction) that is recessed farther than the fastener rib 401 to open one side of the insulating sheet 501. For example, as illustrated in FIG. 1, the restricting member 400 may include a base member, e.g., continuously, extending along the first direction (x-axis direction), e.g., to overlap tops of all the unit cells 100, a plurality of fastener ribs 401 extending from the base member in the third direction (the y-axis direction) while being spaced apart from each other in the first direction (the x-axis direction), and a recess portion 402 between every two adjacent fastener ribs 401. For example, as illustrated in FIGS. 1-2, the fastener ribs 401 overlap tops of respective unit cells 100, and the recess portion 402 overlap respective insulating sheet 501 to expose the insulating sheets 501.

For example, as illustrated in FIG. 1, two restricting members 400 may be disposed at opposite ends of the module frame 300, e.g., spaced apart from each other along the y-axis, on the rechargeable battery module 1 to extend in x-axis direction. Each of the two restricting members 400 may include fastener ribs 401 protruding toward each other in the third direction (y-axis direction) and the recess portion 402 therebetween. The restricting member 400 is fixed to the module frame 300 by the first fastening member 411 to press the cap plate 20 of the unit cell 100 with the fastener rib 401, e.g., the first fastening member 411 may extend through the base member of the restricting member 400 into the module frame 300 (FIG. 3).

Since the base member of the restricting member 400 is fixed to the module frame 300, the fastener ribs 401 extending from the base member toward the unit cells 100 press cap plates 20 of respective unit cells 100 at an upper side thereof in the z-axis direction, i.e., downwardly. For example, each fastener rib 401 may correspond to one unit cell 100. As the unit cells 100' are supported by the bottom of the module frame 300 and the restricting member 400, i.e., pressed between the bottom of the module frame 300 and the restricting member 400, movement of the unit cells 100 may be restricted in a vertical direction, i.e., up and down in the z-axis direction, inside the module frame 300.

Due to the impact and the vibration in the unit cell 100, the restricting member 400 may have an irregular height in the z-axis direction within an entire length of the x-axis direction. The recess portion 402 may absorb a height deviation of the z-axis direction of the restricting member 400 between the fastener ribs 401 in a safe range of the bus bar 200.

In addition, as illustrated in FIG. 5, an insulating sheet 502 is interposed in the first gap G1 formed between the opposite ends of the unit cell 100 and the inner wall of the module frame 300 in the y-axis direction, e.g., the insulating sheet 502 may be between the inner wall of the module frame 300 and adjacent ends of the unit cells 100. The insulating sheet 502 improves electrical insulation performance of the unit cell 100, and absorbs and reduces the impact and the vibration between the module frame 300 and the unit cell 100.

As such, in the rechargeable battery module 1, since the unit cells 100 are tightly fixed to the inside of the module frame 300, the breakdown and the short circuit of the bus bar 200 connecting the electrode terminals 21 and 22 of the unit cells 100 may be prevented. Accordingly, a usage period of the vehicle to which the rechargeable battery module 1 is applied may be stably ensured.

Hereinafter, various exemplary embodiments will be described. In the following exemplary embodiments, same configuration as described previously will be omitted, and only differences relative to the embodiments of FIGS. 1-5 will be described.

Figure 6:
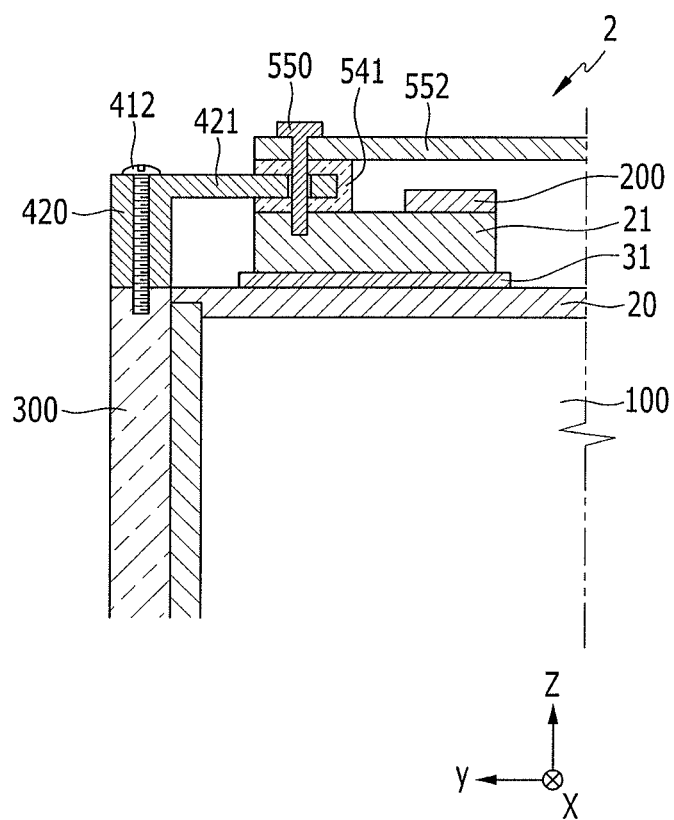
FIG. 6 illustrates a partial cross-sectional view of a rechargeable battery module according to a second exemplary embodiment.

FIG. 6 illustrates a partial cross-sectional view of a rechargeable battery module according to a second exemplary embodiment. Referring to FIG. 6, in the third direction (y-axis direction) of a rechargeable battery module 2 of the second exemplary embodiment, a restricting member 420 is fixed to the module frame 300 by a first fastening member 412, and the electrode terminal 21 of the unit cell 100 is pressed in the second direction (z-axis direction) by a fastener rib 421.

The rechargeable battery module 2 of the second exemplary embodiment includes a first insulating member 541, a printed circuit board 552, and a second fastening member 550. The printed circuit board 552 is connected to measure a voltage of the unit cell 100, and a safety apparatus controlling the rechargeable battery module 2 by using the measured voltage is provided. The first insulating member 541 is integrally provided between the fastener rib 421 and the electrode terminal 21 and on an upper surface of the fastener rib 421. The printed circuit board 552 is provided on the first insulating member 541. The second fastening member 550 passes through the printed circuit board 552, the fastener rib 421, and the first insulating member 541 to be fastened to the electrode terminal 21.

Since the restricting member 420 and fastener rib 421 press the electrode terminal 21 with the first insulating member 541 therebetween in the upper side of the z-axis direction, the unit cell 100 supported to the bottom of the module frame 300 may be restricted in opposite sides of the z-axis direction inside the module frame 300. The first insulating member 541 improves the electrical insulation performance between the unit cell 100 and electrode terminal 21 and the printed circuit board 552, and absorbs and reduces the impact and the vibration between the module frame 300 and the unit cell 100, i.e., between the restricting member 420 and the electrode terminal 21.

Figure 7:
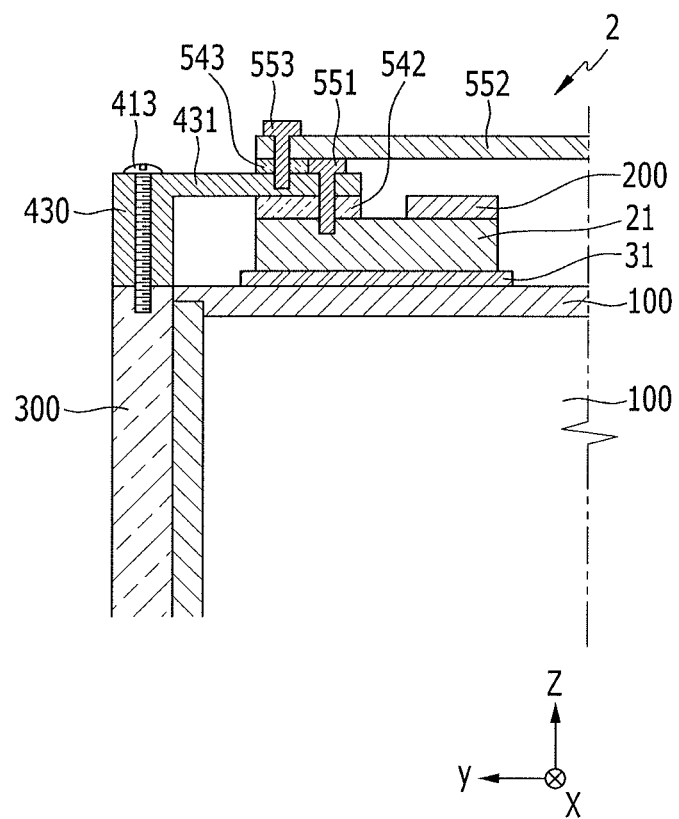
FIG. 7 illustrates a partial cross-sectional view of a rechargeable battery module according to a third exemplary embodiment.

FIG. 7 illustrates a partial cross-sectional view of a rechargeable battery module according to a third exemplary embodiment. Referring to FIG. 7, in the third direction (y-axis direction) of a rechargeable battery module 3 of the third exemplary embodiment, a restricting member 430 is fixed to the module frame 300 by a first fastening member 413, and the electrode terminal 21 of the unit cell 100 is pressed in the second direction (z-axis direction) by a fastener rib 431 with a second insulating member 542 therebetween.

The rechargeable battery module 3 of the third exemplary embodiment includes the second insulating member 542, a second fastening member 551, the printed circuit board 552, a third insulating member 543, and a third fastening member 553. The second insulating member 542 is disposed between the electrode terminal 21 and the fastener rib 431. The second fastening member 551 passes through the fastener rib 431 and the second insulating member 542 to be fastened to the electrode terminal 21. The printed circuit board 552 is provided on the fastener rib 431 with the third insulating member 543 therebetween. The third fastening member 553 passes through the printed circuit board 552 and the third insulating member 543 to be fastened to the fastener rib 431.

Since the restricting member 430 and the fastener rib 431 press the electrode terminal 21 with the second insulating member 542 therebetween in the upper side of the z-axis direction and the second fastening member 551 passes through the fastener rib 431 and the second insulating member 542 to be fastened to the electrode terminal 21, the unit cell 100 supported to the bottom of the module frame 300 may be restricted in the opposite sides of the z-axis direction inside the module frame 300. In addition, since the printed circuit board 552 is disposed on the fastener rib 431 with the third insulating member 543 therebetween in the upper side of the z-axis direction and the third fastening member 553 passes through the printed circuit board 552 and the third insulating member 543 to be fastened to the fastener rib 431, the unit cell 100 supported to the bottom of the module frame 300 may be further restricted in the opposite sides of the z-axis direction inside the module frame 300.

The second and third insulating members 542 and 543 respectively improve the electrical insulation performance between the unit cell 100 and electrode terminal 21 and the fastener rib 431 and between the fastener rib 431 and the printed circuit board 552, and absorbs and reduces the impact and the vibration between the module frame 300 and the unit cell 100, that is, between the restricting member 430 and the electrode terminal 21 and between the restricting member 430 and the printed circuit board 552.

Hereinafter, a rechargeable battery pack formed by applying the rechargeable battery modules will be described. For convenience, it will be described that the rechargeable battery module 1 of the first exemplary embodiment is applied thereto.

Figure 8:
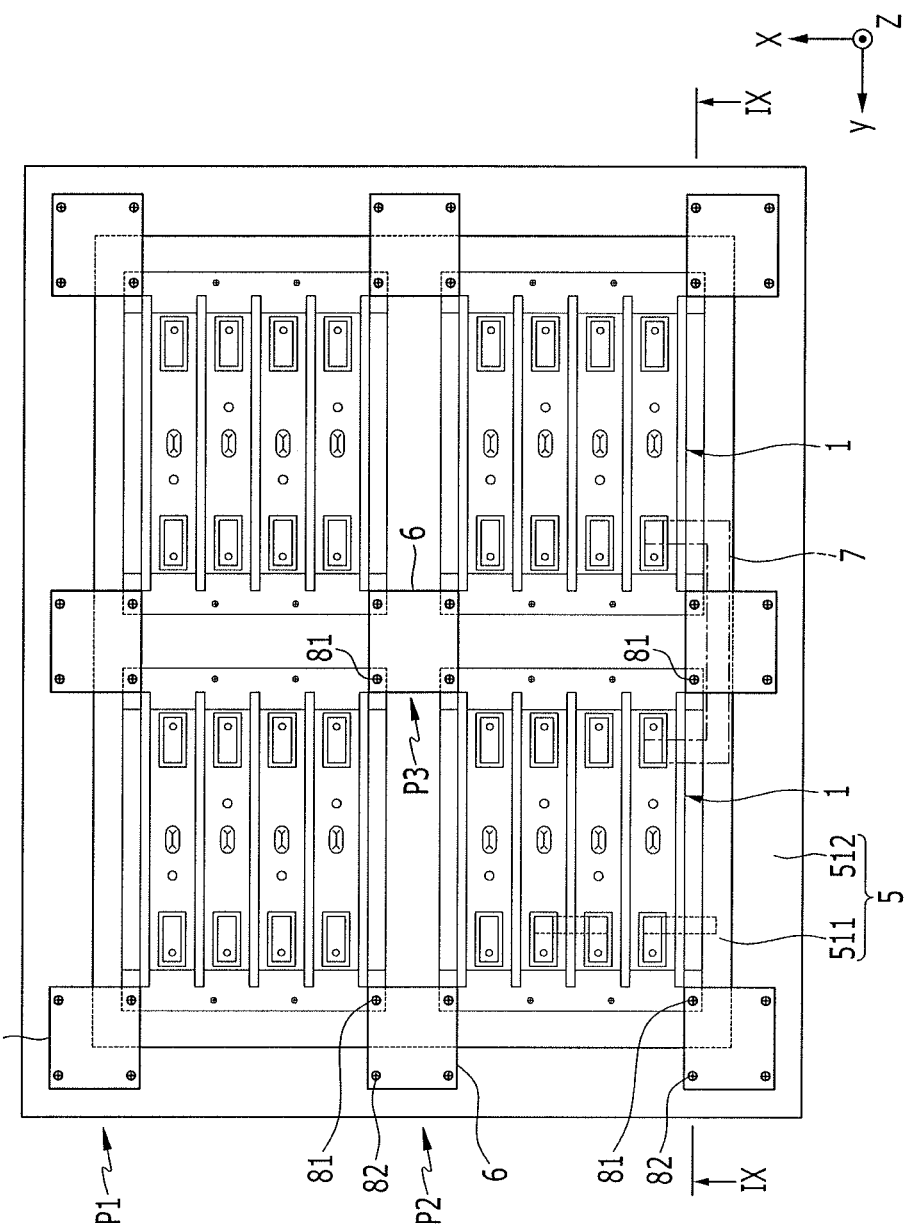
FIG. 8 illustrates a top plan view of a rechargeable battery pack according to an exemplary embodiment.
Figure 9:
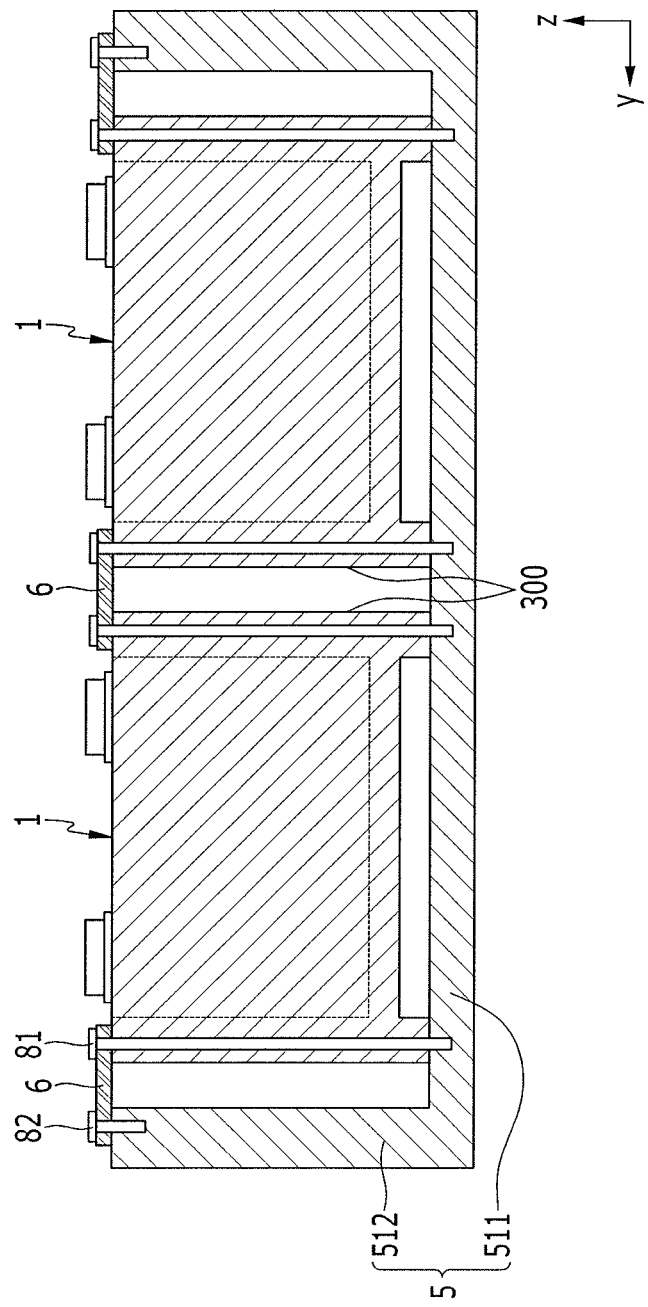
FIG. 9 illustrates a cross-sectional view taken along line IX-IX of FIG. 8.

FIG. 8 illustrates a top plan view of a rechargeable battery pack according to an exemplary embodiment, and FIG. 9 illustrates a cross-sectional view taken along line IX-IX of FIG. 8. Referring to FIG. 8 and FIG. 9, a rechargeable battery pack of an exemplary embodiment includes a plurality of the rechargeable battery modules 1, a pack frame 5, and a bracket 6. The rechargeable battery modules 1 are connected by the module bus bar 7.

The pack frame 5 accommodates the plurality of rechargeable battery modules 1 that are disposed to be adjacent to each other in the first direction (x-axis direction) and the third direction (y-axis direction) crossing each other in a surface (x-y plane). In the pack frame 5 of the exemplary embodiment, four rechargeable battery modules 1 are respectively disposed and accommodated two by two in the x-axis and y-axis directions.

The bracket 6 connects the rechargeable battery module 1 and the pack frame 5 to each other in at least one of the first direction (x-axis direction) and the third direction (y-axis direction), and is fixed to the pack frame 5 in the second direction (z-axis direction) crossing the surface (x-y surface). A plurality of the brackets 6 are provided to be able to fix the rechargeable battery modules 1 to the pack frame 5.

As an example, the brackets 6 may connects one point of the module frame 300 and three points of the pack frame 5 at a corner P1 of the pack frame 5 to be fixed to a bottom 511 and a lateral wall 512 of the pack frame 5 with four fastening members 81 and 82. Accordingly, the bracket 6 may minimize a deformation of the rechargeable battery module 1 at the corner P1.

The bracket 6 may connect one point of each of two module frames 300 and two points of the pack frame 5 at a side P2 of the pack frame 5 to be fixed to the bottom 511 and the lateral wall 512 of the pack frame 5 with the four fastening members 81 and 82. Accordingly, the bracket 6 may minimize a deformation of the rechargeable battery module 1 at the side P2.

The bracket 6 may connect respective one points of each of four the module frames 300 at a position P3 spaced apart from the pack frame 5 to be fixed to the bottom 511 of the pack frame 5 with four fastening members 81. Accordingly, the brackets 6 may minimize a deformation of the rechargeable battery module 1 at the position P3 spaced apart from the pack frame 5.

As such, since the rechargeable battery modules 1 are tightly fixed inside the pack frame 5 of the rechargeable battery pack, the impact and the vibration between the rechargeable battery modules 1 and the pack frame 5 are absorbed by the module frame 300, the brackets 6, and the pack frame 5, thus the breakdown and the short circuit of the module bus bar 7 for connecting the rechargeable battery modules 1 may be prevented. Accordingly, a usage period of the vehicle to which the rechargeable battery pack is applied may be ensured.

By way of summation and review, when a rechargeable battery module or a pack is applied to a vehicle, it may be under harsh environmental conditions, e.g., impact, vibration, and/or heat of the vehicle. If the unit cells of the rechargeable battery module or pack were to be restricted only in a single horizontal direction, the unit cells could have moved in other horizontal directions or in a vertical direction within the frame. Accordingly, a breakdown and a short circuit of the bus bar could have occurred.

In contrast, according to embodiments, a rechargeable battery module may include unit cells within a module frame and fixed to the module frame, such that a breakdown or a short circuit of a bus bar due to harsh environmental conditions (e.g., impact, vibration, and heat) may be prevented. That is, a plurality of unit cells are accommodated in a module frame, electrode terminals are connected by a bus bar, and then a restricting member is fixed to the module frame for restricting the unit cells. Therefore, it is possible to prevent a breakdown and a short circuit of the bus bars for connecting the unit cells due to a harsh environmental condition (e.g., impact, vibration, and heat). In addition, since a plurality of rechargeable battery modules are accommodated in a pack frame and then the rechargeable battery modules are fixed to the pack frame by a bracket, it is possible to prevent a breakdown and a short circuit of a bus bar for connecting the rechargeable battery modules due to a harsh environmental condition.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery module, comprising:
   a plurality of unit cells adjacent to each other in a first direction, each unit cell including an electrode assembly in a case, a cap plate sealing an opening of the case, and an electrode terminal electrically connected to the electrode assembly through the cap plate;
   a bus bar electrically connecting electrode terminals of unit cells adjacent in the first direction;
   a module frame accommodating the plurality of unit cells, the module frame including at least two sidewalls spaced apart from each other in the first direction to restrict opposite sides of the first direction, and a bottom supporting the at least two side walls;
   a restricting member fixed to a top of the module frame, the restricting member being spaced apart from the bottom of the module frame along a second direction perpendicular to the first direction to restrict a position of the unit cells in the second direction; and
   an insulating sheet between adjacent unit cells, and between the at least two sidewalls of the module frame and respective unit cells,
   wherein the unit cells are between the restricting member and the bottom of the module frame in the second direction,
   wherein the restricting member includes at least one fastener rib protruding in a third direction toward a respective unit cell of the unit cells to press one side of the unit cell, the third direction crossing the second direction, and
   wherein the restricting member further includes at least one recess portion recessed in the third direction farther than the at least one fastener rib in the second direction to expose one side of the insulating sheet.

2. The rechargeable battery module as claimed in claim 1, wherein the restricting member includes at least one fastener rib protruding in a third direction toward a respective unit cell of the unit cells to press one side of the unit cell, the third direction crossing the second direction.

3. The rechargeable battery module as claimed in claim 2, further comprising an insulating sheet between adjacent unit cells, and between the at least two sidewalls of the module frame and respective unit cells.

4. The rechargeable battery module as claimed in claim 2, wherein the restricting member is fixed to the module frame with a first fastening member, and presses the cap plate of the unit cell with the fastener rib.

5. The rechargeable battery module as claimed in claim 2, wherein the restricting member is fixed to the module frame with a first fastening member, and presses the electrode terminal of the unit cell with the fastener rib.

6. The rechargeable battery module as claimed in claim 5, further comprising:
   a first insulating member between the fastener rib and the electrode terminal and on an upper surface of the fastener rib;
   a printed circuit board on the first insulating member; and a second fastening member through the printed circuit board, the fastener rib, and the first insulating member to be fastened to the electrode terminal.

7. The rechargeable battery module as claimed in claim 2, wherein the restricting member is fixed to the module frame with a first fastening member, and presses the electrode terminal of the unit cell with the fastener rib with a second insulating member therebetween.

8. The rechargeable battery module as claimed in claim 7, further comprising:
   a second fastening member through the fastener rib and the second insulating member to be fastened to the electrode terminal;
   a printed circuit board on the fastener rib with a third insulating member therebetween; and
   a third fastening member through the printed circuit board and the third insulating member to be fastened to the fastener rib.

9. A rechargeable battery pack, comprising:
   a plurality of rechargeable battery modules as claimed in claim 1, the plurality of rechargeable battery modules being adjacent to each other in the first direction and in a third direction crossing in a planar surface;
   a pack frame accommodating the rechargeable battery modules; and
   a bracket connecting the rechargeable battery modules and the pack frame to each other in at least one of the first direction and the third direction to be fixed to the pack frame in a second direction crossing the planar surface.

10. The rechargeable battery pack as claimed in claim 9, wherein the bracket connects one point of the module frame and three points of the pack frame at a corner of the pack frame to be fixed to a bottom and a lateral wall of the pack frame.

11. The rechargeable battery pack as claimed in claim 9, wherein the bracket connects one point of each of two module frames and two points of the pack frame at a side of the pack frame to a bottom and a lateral wall of the pack frame.

12. The rechargeable battery pack as claimed in claim 9, wherein the bracket is spaced apart from the pack frame, and connects respective one points of four module frames to be fixed to a bottom of the pack frame.

13. The rechargeable battery pack as claimed in claim 9, wherein the rechargeable battery modules are connected by a module bus bar.

14. A rechargeable battery module, comprising:
   a plurality of unit cells adjacent to each other in a first direction, each unit cell including an electrode assembly in a case, a cap plate sealing an opening of the case, and an electrode terminal electrically connected to the electrode assembly through the cap plate;
   a bus bar electrically connecting electrode terminals of unit cells adjacent in the first direction;
   a module frame accommodating the plurality of unit cells, the module frame including at least two sidewalls spaced apart from each other in the first direction to restrict opposite sides of the first direction, and a bottom supporting the at least two side walls; and
   a restricting member fixed to a top of the module frame, the restricting member being spaced apart from the bottom of the module frame along a second direction perpendicular to the first direction to restrict a position of the unit cells in the second direction;
   wherein the unit cells are between the restricting member and the bottom of the module frame in the second direction,
   wherein the restricting member includes at least one fastener rib protruding in a third direction toward a respective unit cell of the unit cells to press one side of the unit cell, the third direction crossing the second direction, and
   wherein the restricting member is fixed to the module frame with a first fastening member, and presses the electrode terminal of the unit cell with the fastener rib with a second insulating member therebetween.

15. The rechargeable battery module as claimed in claim 14, wherein the restricting member includes at least one fastener rib protruding in a third direction toward a respective unit cell of the unit cells to press one side of the unit cell, the third direction crossing the second direction.

16. The rechargeable battery module as claimed in claim 15, further comprising an insulating sheet between adjacent unit cells, and between the at least two sidewalls of the module frame and respective unit cells.

17. The rechargeable battery module as claimed in claim 16, wherein the restricting member further includes at least one recess portion recessed in the third direction farther than the at least one fastener rib in the second direction to expose one side of the insulating sheet.

18. The rechargeable battery module as claimed in claim 14, wherein the restricting member is fixed to the module frame with a first fastening member, and presses the cap plate of the unit cell with the fastener rib.

19. The rechargeable battery module as claimed in claim 14, wherein the restricting member is fixed to the module frame with a first fastening member, and presses the electrode terminal of the unit cell with the fastener rib.

20. The rechargeable battery module as claimed in claim 19, further comprising:
   a first insulating member between the fastener rib and the electrode terminal and on an upper surface of the fastener rib;
   a printed circuit board on the first insulating member; and
   a second fastening member through the printed circuit board, the fastener rib, and the first insulating member to be fastened to the electrode terminal.

* * * * *